(12) United States Patent
Hirai et al.

(10) Patent No.: US 9,253,385 B2
(45) Date of Patent: Feb. 2, 2016

(54) IMAGING APPARATUS

(71) Applicant: CANON KABUSHIKI KAISHA, Tokyo (JP)

(72) Inventors: Futoshi Hirai, Kawasaki (JP); Toru Kawashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/682,734

(22) Filed: Apr. 9, 2015

(65) Prior Publication Data

US 2015/0215508 A1 Jul. 30, 2015

Related U.S. Application Data

(62) Division of application No. 13/974,675, filed on Aug. 23, 2013, now Pat. No. 9,113,062.

(30) Foreign Application Priority Data

Aug. 28, 2012 (JP) .................................. 2012-188015
Aug. 28, 2012 (JP) .................................. 2012-188016

(51) Int. Cl.
*H04N 5/225* (2006.01)
*G03B 17/02* (2006.01)
*H04N 5/44* (2011.01)

(52) U.S. Cl.
CPC .............. *H04N 5/2254* (2013.01); *G03B 17/02* (2013.01); *H04N 5/2252* (2013.01); *H04N 5/2256* (2013.01); *H04N 5/44* (2013.01); *G03B 2206/00* (2013.01)

(58) Field of Classification Search
None
See application file for complete search history.

(56) References Cited

FOREIGN PATENT DOCUMENTS

JP 2000075381 A * 3/2000
JP 2008244735 A * 10/2008

* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.; Mark Montague

(57) ABSTRACT

An imaging apparatus includes a pentaprism that guides incident light to an eyepiece optical system and a plurality of outer covering members. Among the photographing light flux incident from a photographing optical system, light reflected by a rotary mirror 52*m* is further reflected by the reflection surface of the pentaprism to thereby reach an ocular lens. A wireless substrate on which an antenna section is mounted is arranged between the pentaprism and a front outer cover. The substrate fixing member is a member for fixing the wireless substrate and the ground section of the wireless substrate is connected to the substrate fixing member at a position facing the antenna section with the optical axis of the eyepiece optical system therebetween. The substrate fixing member is attached to a pentaprism fixing member so as to be electrically connected to the ground section of the imaging apparatus. The electrical resistivity of a region facing the antenna section in the front outer cover is set relatively higher than the periphery of the region.

7 Claims, 7 Drawing Sheets

IMAGING APPARATUS

CROSS-REFERENCE TO RELATED APPLICATION

This application is a divisional of application Ser. No. 13/974,675, filed Aug. 23, 2013, the entire disclosure of which is hereby incorporated by reference.

BACKGROUND OF THE INVENTION

1. Field of the Invention

The present invention relates to an imaging apparatus that incorporates a wireless communication unit.

2. Description of the Related Art

Conventionally, there has been proposed a configuration of an imaging apparatus in which a wireless communication unit is arranged on the top side of a pentaprism in a finder section (see Japanese Patent Laid-Open No. 2008-244735). However, an accessory shoe for providing communication by being connected to an external device such as a strobe is provided on the visible face of an imaging apparatus. Therefore, the metal section of the accessory shoe disturbs a radio wave to be emitted from or received by the antenna section of the wireless communication unit upon wireless communication, so that stable communication state cannot be obtained. In addition, the clearance between the wireless communication unit and the clearance between the wireless communication unit and the accessory shoe needs to be ensured, resulting in an undesirable increase in size in the height direction of the imaging apparatus. Accordingly, Japanese Patent Laid-Open No. 2000-75381 discloses a configuration in which the wireless communication unit is arranged on the inclined surface (Dach surface) of the pentaprism such that the accessory shoe does not disturb a radio wave upon wireless communication.

When the configuration disclosed in Japanese Patent Laid-Open No. 2000-75381 is applied to an imaging apparatus that incorporates a strobe device or the like, the clearance between the wireless communication unit and the built-in strobe device needs to be ensured, and thus, the size in the periphery of the strobe needs to be increased. Consequently, the height-dimension of the imaging apparatus undesirably increases.

SUMMARY OF THE INVENTION

The present invention provides an imaging apparatus that incorporates a wireless communication unit so as to ensure stable wireless communication state without increasing the size of the imaging apparatus.

According to an aspect of the present invention, an imaging apparatus that incorporates a wireless communication unit for performing wireless communication is provided that includes an optical member that guides light incident on the imaging apparatus to an eyepiece optical system; a plurality of outer covering members that cover the optical member; and a substrate fixing member that fixes a substrate on which the antenna section of the wireless communication unit is mounted. The wireless communication unit is arranged in a space formed between the optical member and the outer covering members, a ground section of the wireless communication unit is connected to the substrate fixing member at a position facing the antenna section with the optical axis of the eyepiece optical system therebetween, and the substrate fixing member is attached to a member for holding the optical member so as to be electrically connected to the ground section of the imaging apparatus.

According to the present invention, an imaging apparatus that incorporates a wireless communication unit so as to ensure stable wireless communication state without increasing the size of the imaging apparatus may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

First Embodiment

Figure 1A:
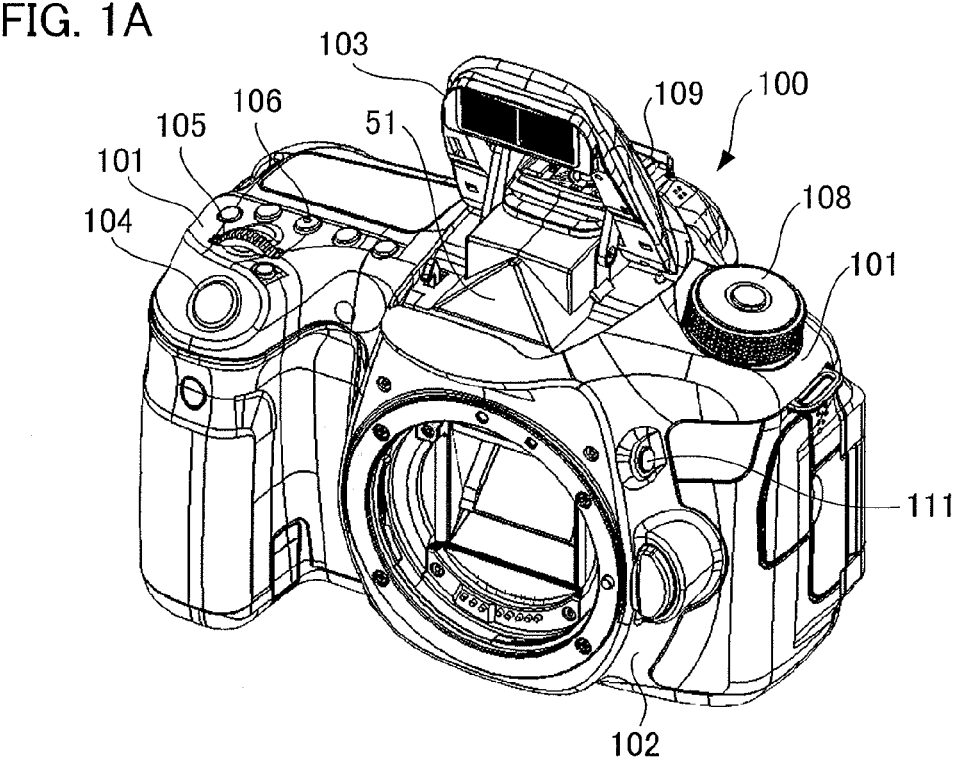
FIGS. 1A and 1B are perspective view illustrating an exemplary external appearance of an imaging apparatus according to a first embodiment of the present invention in conjunction with FIGS. 2 to 6.
Figure 1B:
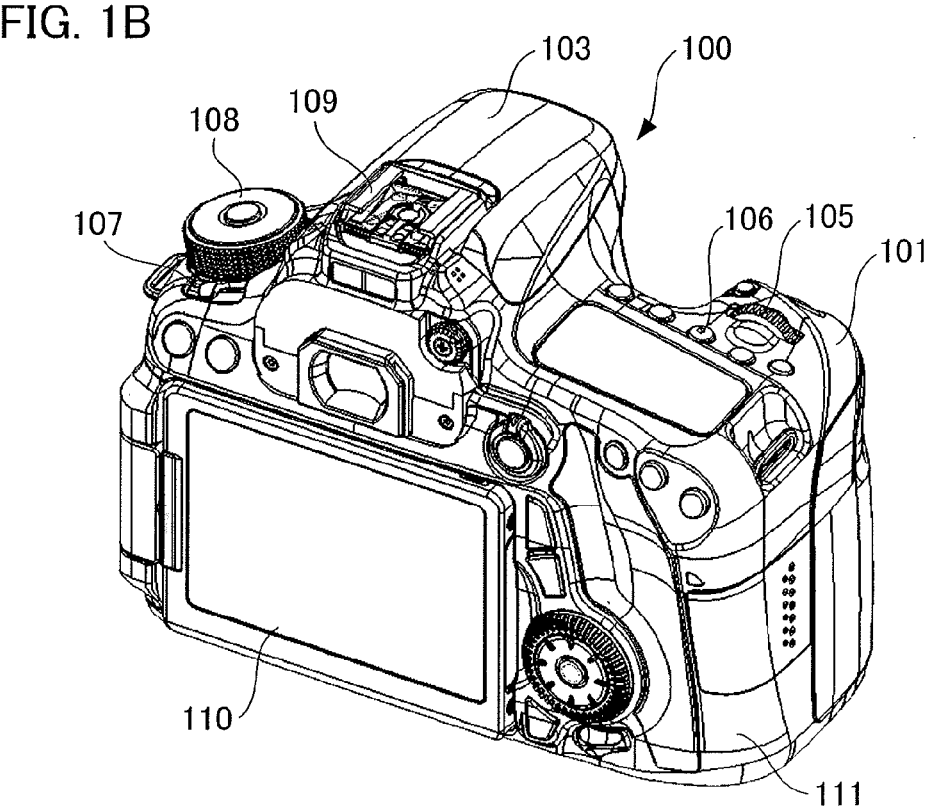
Figure 2:
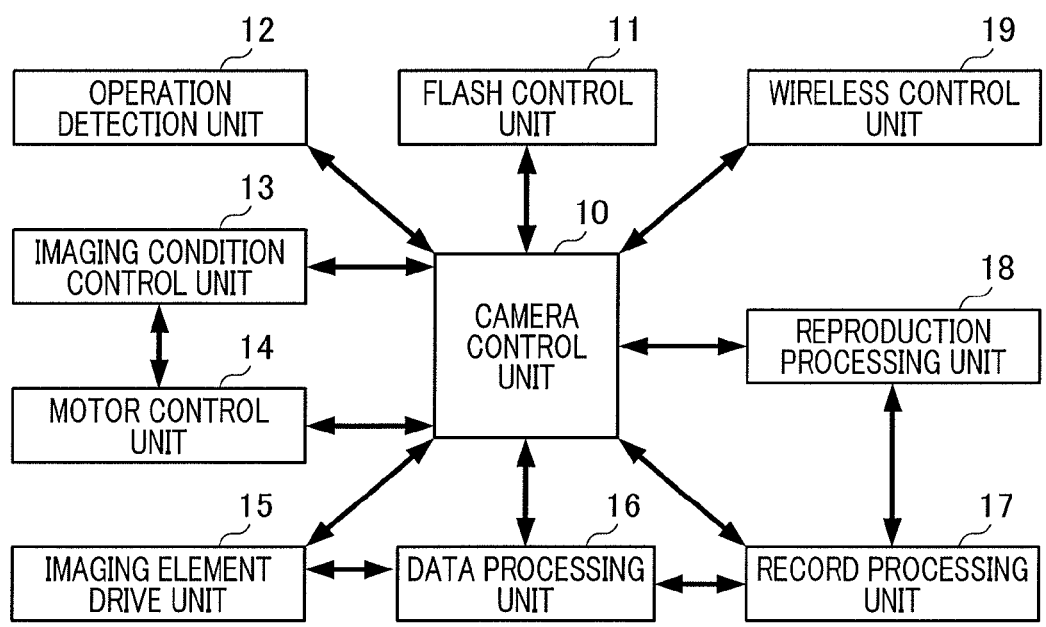
FIG. 2 is a block view illustrating an exemplary configuration of an imaging apparatus.

A schematic description will be given of an imaging apparatus according to a first embodiment of the present invention with reference to FIG. 1A, FIG. 1B, and FIG. 2. FIG. 1A is a perspective view illustrating an exemplary external appearance of a camera body 100 as an example of the imaging apparatus of the first embodiment with a strobe light-emitting section being moved to a light-emitting position. FIG. 1B is a perspective view illustrating an external appearance of the camera body 100 with the strobe light-emitting section being stored therein as viewed from the rear side of the camera body 100. Hereinafter, a description will be given of the positional relationship between parts by defining the front of the camera body 100 as viewed from the object side as the front surface and by defining the vertical direction and the horizontal direction of the camera body 100 as viewed from the object side. FIG. 2 is a block diagram illustrating the main constituent parts of the camera.

The camera body 100 is covered by a plurality of outer covering members. A top outer cover 101 is a first outer covering member that covers the upper part of the camera. A main power supply switch 107 shown in FIG. 1B is provided on the top surface of the camera. When a user operates the main power supply switch 107 to the ON position, a camera control unit 10 (see FIG. 2) causes a CPU (Central Processing Unit) to execute camera activation processing in accordance with a predetermined sequence. In general, a flash unit 103 is held at a stored position in the power-OFF state. The light emitting section of the flash unit 103 in a stored state is positioned in the vicinity of the front side of a pentaprism to be described below.

The camera control unit 10 receives an operation signal for an operation member from an operation detection unit 12 to thereby make settings corresponding to an operation instruction. For example, when a user selects an image capturing mode by operating an image capturing mode dial 108 which is arranged towards the right end of the top surface of the camera, the camera control unit 10 sets a program diagram for setting a combination of a shutter speed and an aperture depending on the selected image capturing mode. Also, setting processing such as exposure correction is performed depending on the operation of an electric dial 105 which is arranged towards the left end of the top surface of the camera, and ISO sensitivity condition setting processing is performed depending on the operation of an ISO sensitivity setting button 106.

When an automatic setting mode is selected by the image capturing mode dial 108 and the pressing of a release button 104 (see FIG. 1A) to the first position is detected by the operation detection unit 12, the camera control unit 10 sends a control signal to an imaging condition control unit 13. In order to determine appropriate shutter speed and aperture value (F-number) based on the control signal, a photometric sensor (not shown) provided in the vicinity of a finder section measures light from an object. When it is determined from the results of light measurement that light from the object is lower than a predetermined brightness, the camera control unit 10 sends a control signal to a motor control unit 14 and drives a motor (not shown) so as to move the flash unit 103 to a light-emitting position. A drive mechanism moves the flash unit 103 to the light-emitting position as shown in FIG. 1A. When the pressing of the release button 104 to the second position is detected by the operation detection unit 12, the camera control unit 10 sends a control signal to the motor control unit 14 and retracts a mirror unit to be described below to a predetermined position so that light from the object reaches an imaging element (not shown). The camera control unit 10 performs shutter open control, sends a control signal to a flash control unit 11, and causes the flash unit 103 to emit light at a predetermined timing to thereby irradiate an object with appropriate light. After an emission of light by the flash unit 103, the camera control unit 10 sends a control signal to the motor control unit 14 to thereby shield a shutter from light after elapse of a predetermined time. In the state where light has reached the object, the camera control unit 10 sends a control signal to an imaging element drive unit 15 and the imaging element performs processing for acquiring imaging data by photoelectric conversion of the received light image. Imaging data is sent to a data processing unit 16 and then is subject to various types of processing such as amplification, conversion, correction, or the like so as to obtain image data.

The camera control unit 10 controls a record processing unit 7 to record the photographed image data in a recording medium (not shown). When a user or photographer operates an image reproduction button (not shown), the camera control unit 10 controls a reproduction processing unit 18 and reads out the recorded image data from the recording medium to thereby cause a display unit 110 which is provided on the rear surface of the camera body 100 to display the photographed image. Also, the camera control unit 10 controls communication processing with external equipment (personal computer or the like) using a wireless communication function. For example, when the user or photographer confirms a photographed image and transmits image data to external equipment, the user or photographer can select a wireless communication function from a menu screen displayed on the display unit 110. In this case, the camera control unit 10 sends a control signal to a wireless control unit 19 and establishes a stable communication state in accordance with a predetermined wireless standard. Then, the camera control unit 10 radio-transmits image data to external equipment. Note that data to be transmitted and received is not limited to image data but any data may be used for communication.

An accessory shoe 109 is used for the installation of an accessory component such as an external strobe or the like and is communicably connected to constituent parts inside the camera at a predetermined contact part.

Figure 3:
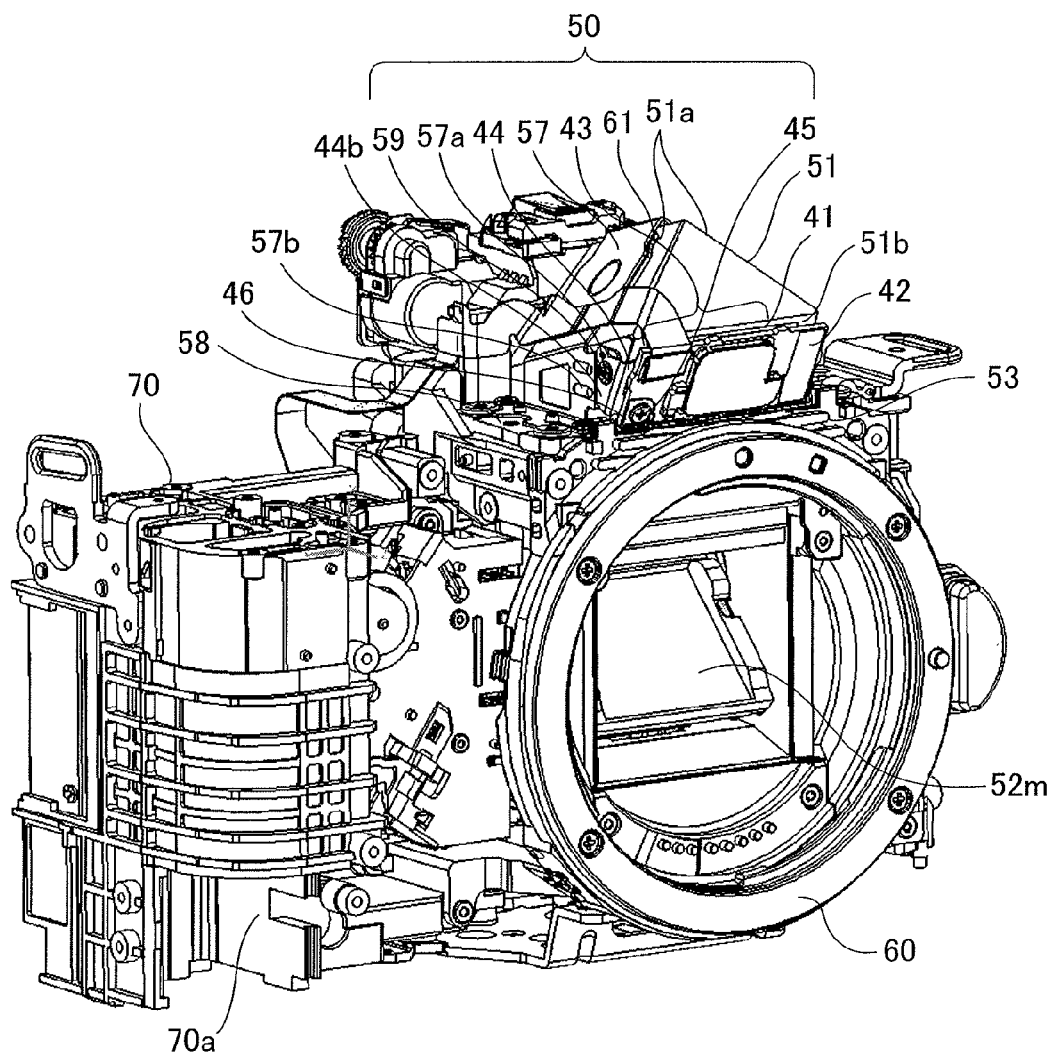
FIG. 3 is a perspective view illustrating an imaging apparatus with the outer covering member removed therefrom.
Figure 4:
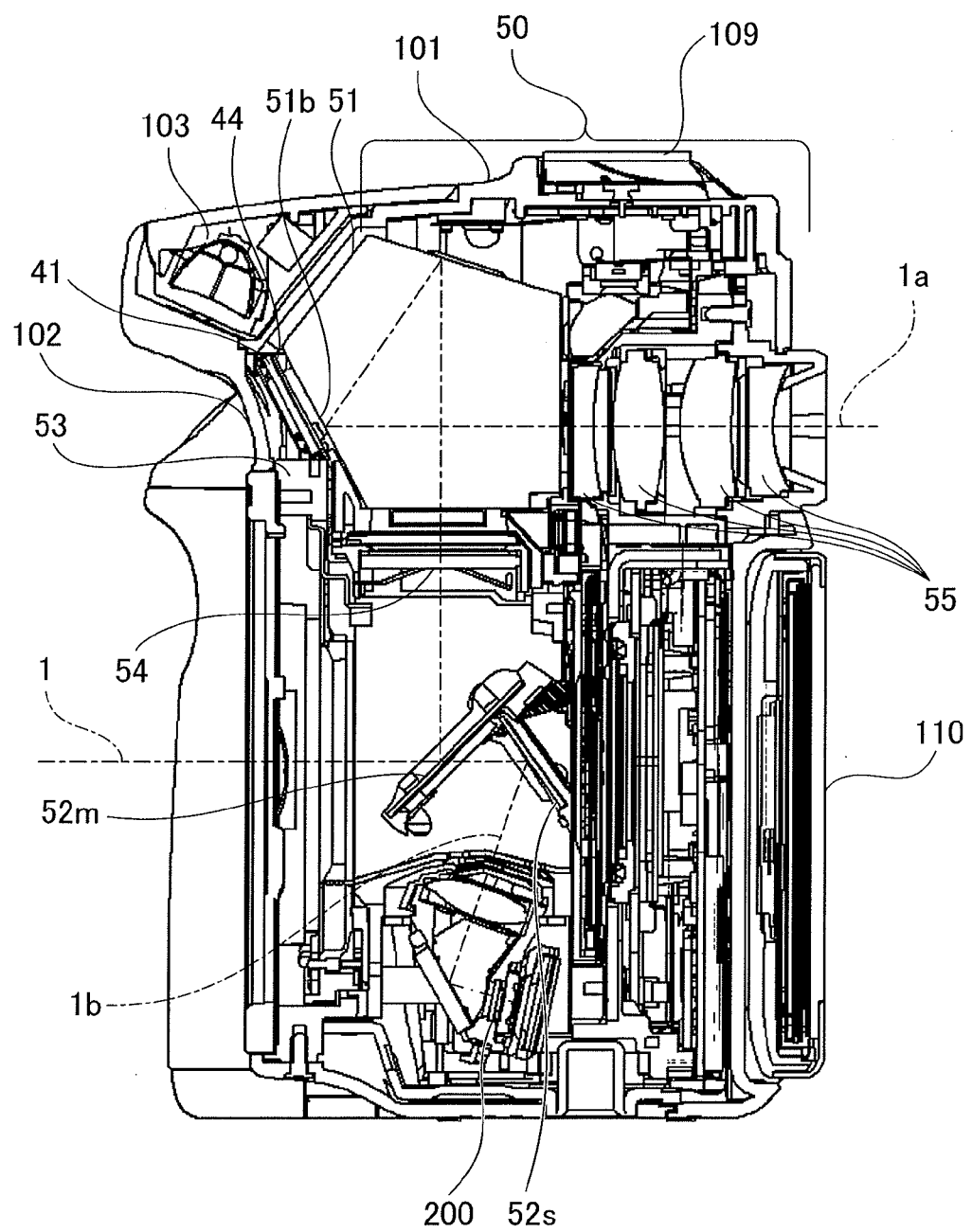
FIG. 4 is a central vertical-sectional view of an imaging apparatus.

Next, a description will be given of a method for arranging and fixing a wireless communication unit of the present embodiment with reference to FIGS. 3 to 5.

A wireless communication unit that is used for communication with external equipment is constituted by an antenna section 42 and a communication unit 43 incorporating a communication element which are arranged on a wireless substrate 41. The antenna section 42 is formed as a circuit pattern printed on the wireless substrate 41 or a chip antenna formed by an electrical component. While, in the present embodiment, a description will be given of a configuration in which the antenna section 42 and the communication unit 43 are arranged on the same substrate, the present invention is not limited thereto. For example, the antenna section 42 and the communication unit 43 may also be arranged on different substrates at different locations.

The pentaprism 51 constituting the finder section 50 is arranged at the upper part of the camera body 100. A rotary mirror 52m serving as a first reflection member constituting a mirror unit and a holding frame (hereinafter referred to as "mirror box") 53 for rotatably holding the rotary mirror 52m are located under the pentaprism 51. A part of photographing light flux incident along the optical axis 1 (see FIG. 4) of the imaging optical system is reflected by the rotary mirror 52m and then is incident on the pentaprism 51 by passing through a focusing plate 54. In the present embodiment, a description will be given by taking an example of a penta-dach prism as an optical member that guides light incident from a taking lens unit (interchangeable lens) (not shown) on the camera body 100 to an eyepiece optical system. The optical member may also be a penta-dach mirror. The light flux incident on the inside of the pentaprism 51 is completely reflected by a Dach surface 51a (see FIG. 3) serving as a first reflection surface to reverse the left-right appearance of an image. Then, the light flux is reflected by a second reflection surface 51b on the front side to thereby change the optical path in a direction of an ocular lens 55. The user or photographer can confirm the object by observing light traveling along the optical axis 1a of the eyepiece optical system including the ocular lens 55.

The light passed through the translucent rotary mirror 52m is reflected by a sub mirror 52s serving as a second reflection member and travels along the optical axis 1b to thereby reach a focus state detection unit 200. The focus state detection unit 200 is used for controlling automatic focus adjustment in a phase difference detection type, and detects a focus state by calculating a positional shift amount of an image using a plurality of detection elements.

As shown in FIG. 5, a wireless substrate 41 is arranged substantially in parallel with the second reflection surface 51b on the front side of the second reflection surface 51b of the pentaprism 51. With this arrangement, the wireless communication unit is held in a space formed among the pentaprism 51, the mirror box 53, and a front outer cover 102 at a position where the wireless communication unit does not interfere with other components such as the flash unit 103 or the like.

Specifically, the arrangement of the wireless communication unit does not affect the position at which the flash unit 103 is stored. The wireless substrate 41 is supported by being attached to a substrate fixing member 44. The substrate fixing member 44 is formed of a conductive material and serves as a member for fixing the wireless substrate 41 to the finder section 50. In the state where the wireless substrate 41 is positioned on the substrate fixing member 44, the exposed portion of a ground pattern formed on the wireless substrate 41 is also a fastening part 46 of the substrate fixing member 44 and is fastened and secured by a fastening member 45. A screw used as the fastening member 45 is formed of a conductive material such as metal or the like. The fastening part 46 between the wireless substrate 41 and the substrate fixing member 44 is arranged at a position facing the antenna section 42 of the wireless substrate 41 with the optical axis 1*a* therebetween. Also, the end surface 44*a* (see FIG. 5B) on the antenna section 42 side of the substrate fixing member 44 is arranged on the left side and about several mm away from the antenna section 42 so as not to adversely affect the radio wave to be emitted from or received by the antenna section 42 upon wireless communication. On the substrate fixing member 44, a bent part 44*b* is formed at a position facing the antenna section 42 of the wireless substrate 41 with the optical axis 1*a* therebetween.

Figure 5A:
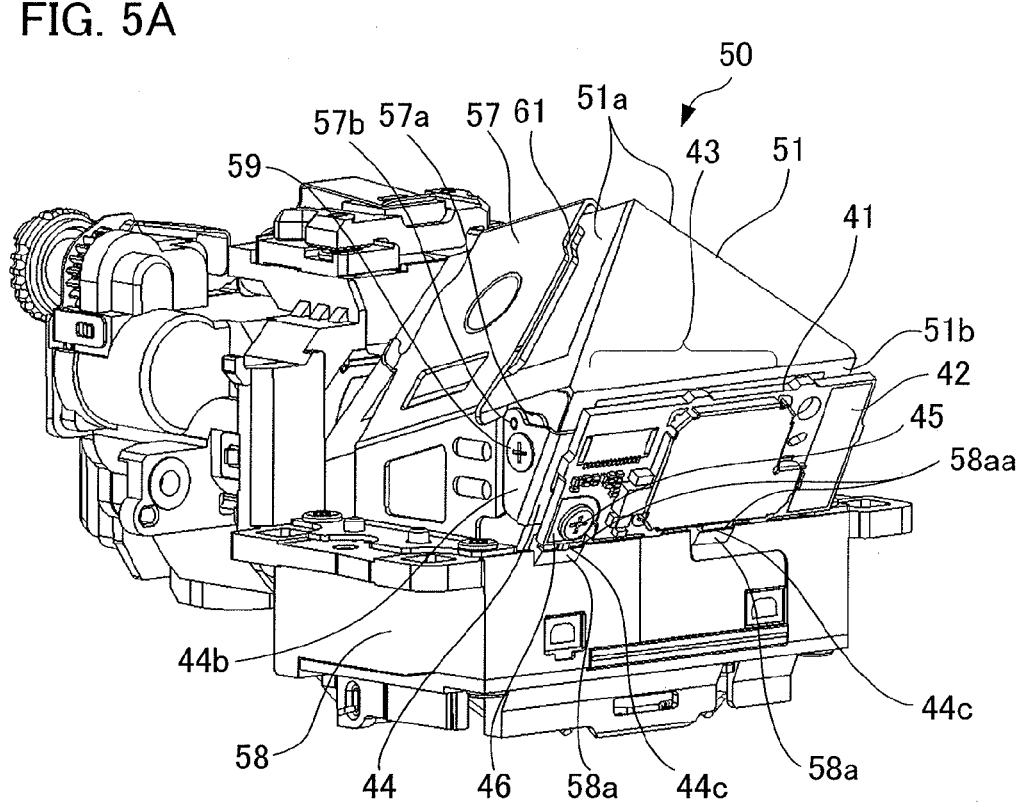
FIG. 5A is a perspective view illustrating a finder section.

Members for holding the pentaprism 51 are a pentaprism fixing member 57 and a pentaprism holding member 58. As shown in FIG. 5A, the pentaprism fixing member 57 is secured to the pentaprism holding member 58 by pressing the pentaprism 51 from the Dach surface 51*a* side with a resilient member 61 therebetween. The pentaprism fixing member 57 is fastened by the screw and is secured to the pentaprism holding member 58. An arm 57*a* extending forwardly is formed on the portion (left side surface section) of the pentaprism fixing member 57 opposite to the antenna section 42 of the wireless substrate 41 with the optical axis 1*a* therebetween. The substrate fixing member 44 is positioned in the horizontal direction by being brought into abutment with the inner surface of the bent part 44*b* of the substrate fixing member 44 from the outer surface of the arm 57*a* so that the substrate fixing member 44 is fastened and secured by a screw 59. A positioning pin 57*b* is integrally formed on the arm 57*a* of the pentaprism fixing member 57 so that the positioning pin 57*b* engages with a positioning hole formed in the arm 44*b* of the substrate fixing member 44. Furthermore, a rack part 58*a* serving as a support is provided at two locations close to the top of the front side of the pentaprism holding member 58. Each of the rack parts 58*a* has an abutment surface part 58*aa* that is substantially vertical to a plane parallel to the second reflection surface 51*b* of the pentaprism 51. The bottom end surface 44*c* of the substrate fixing member 44 is brought into abutment with the abutment surface part 58*aa* of the rack part 58*a* so that the position of the wireless substrate 41 in the height direction is determined. With this arrangement, the wireless substrate 41 is arranged substantially in parallel with the second reflection surface 51*b* of the pentaprism 51.

Figure 5B:
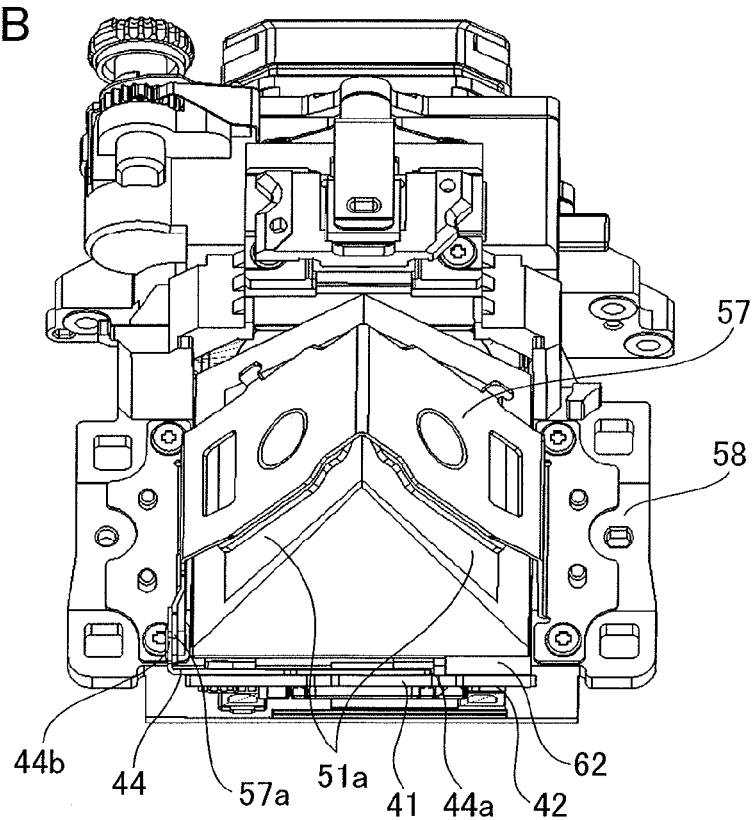
FIG. 5B is a view illustrating a finder section as viewed from the top surface of a wireless substrate.

As shown in FIG. 5B, a non-conductive resilient member 62 is arranged on the rear surface of the antenna section 42 of the wireless substrate 41. The resilient member 62 is bonded and secured to the pentaprism 51 with the resilient member 62 sandwiched between the rear surface of the wireless substrate 41 and the second reflection surface 51*b* of the pentaprism 51.

The pentaprism holding member 58 and the mirror box 53 are members molded with a conductive resin material. The pentaprism holding member 58 is fastened by the screw and is secured to the mirror box 53. Furthermore, a main body frame 70 (see FIG. 3) which is the frame of a camera is constructed by a resin portion 70*a* and a metal frame (not shown). The metal frame and the mirror box 53 are fastened and secured by screws, and thereby the ground section of the wireless substrate 41 is connected to an electrical ground section via the substrate fixing member 44, the pentaprism fixing member 57, the pentaprism holding member 58, and the mirror box 53. In other words, the electrical ground section of the camera body 100 is the metal frame of the main body frame 70, and the ground section of the wireless substrate 41 is electrically connected thereto. While, in the present embodiment, a description has been given of an example in which the pentaprism holding member 58 is provided separately from the mirror box 53, the present invention is not limited thereto but the pentaprism holding member 58 may also be formed integrally with the mirror box 53.

Figure 6:
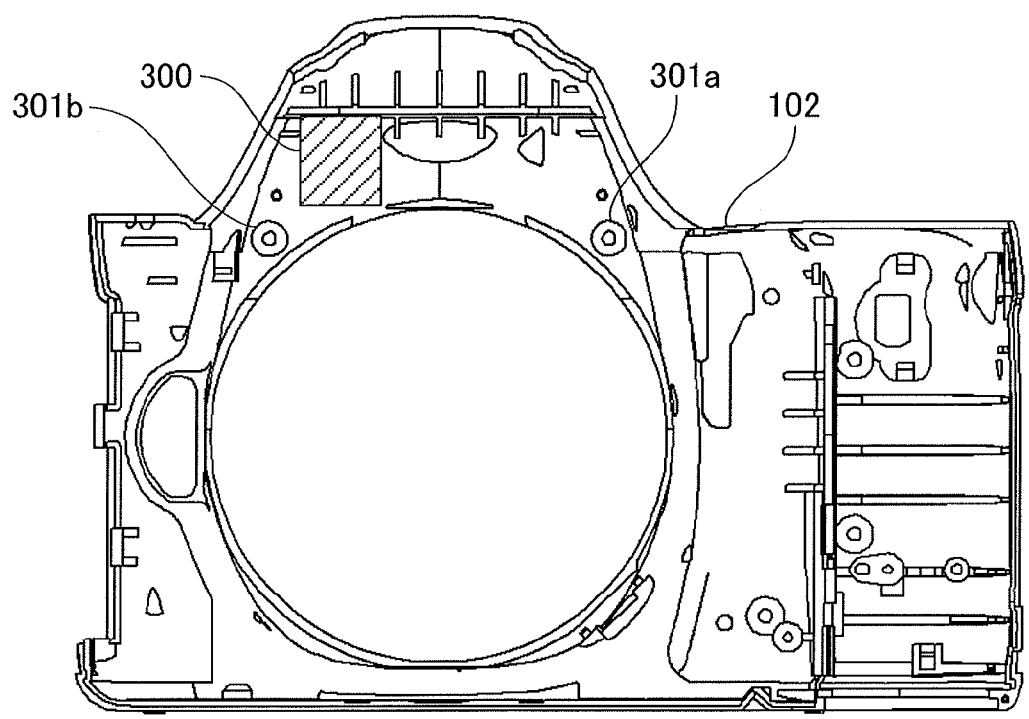
FIG. 6 is a view illustrating a front outer cover as viewed from the interior side thereof.

Next, a description will be given of the outer cover of the camera body 100 with reference to FIG. 1 and FIG. 6.

A method for providing an electromagnetic shielding effect to an outer covering member is known for reducing the effects of electromagnetic wave on the camera operation. There are two known methods: a method for using a metal material or a conductive resin material which is a mixture of a metal fiber and a carbon fiber as an outer cover material and a method for applying conductive coating (coating such as conductive coating, ion plating, or the like) to the surface of non-conductive synthetic resin material.

In the present embodiment, the top outer cover 101 serving as the first outer covering member and the front outer cover 102 serving as the second outer covering member are divided around the periphery of the second reflection surface 51*b* of the pentaprism 51. As viewed from the front side, the wireless substrate 41 is substantially entirely covered by the front outer cover 102. Thus, if the area around the antenna section 42 of the wireless substrate 41 is covered by a conductive material, the antenna section 42 cannot emit a radio wave for wireless communication, resulting in a trouble in communication. Thus, the front outer cover 102 is molded with a material having high electrical resistivity. For example, the top outer cover 101 and a rear outer cover 111 are molded with a carbon fiber-mixed resin, i.e., a resin material mixed with a carbon fiber. On the other hand, the front outer cover 102 is molded with a resin material mixed with a glass fiber having higher electrical resistivity than that of the top outer cover 101 and the rear outer cover 111. It should be noted that the present invention is not limited thereto but the top outer cover 101 and the rear outer cover 111 may be formed of a metal material or may also be formed of a material in which conductive coating is applied to a glass fiber-mixed resin. For the front outer cover 102, a material having an electrical resistivity high enough for wireless communication is applicable.

Next, a description will be given of conductive coating formed on the interior surface of the front outer cover 102 with reference to FIG. 6. FIG. 6 is a view illustrating the front outer cover 102 as viewed from the interior side of the camera body 100. Hereinafter, a description will be given of a range in which conductive coating is formed. For conductive coating to be formed by surface processing, conductive coating, coating by ion plating, or other conductive coating may be employed. In the present embodiment, a description will be given by taking an example of conductive coating.

The region in which conductive coating is formed and the region in which a conductive coating film or a vapor-deposited film is not formed as shown in a region 300 (see shaded part) are provided on the interior surface of the front outer cover 102. The region 300 includes a region facing the antenna section 42 of the wireless substrate 41 and a peripheral region thereof. The region 300 is also a region in which a conductive coating film or a vapor-deposited film is not formed. The region 300 is set to be a range larger than an area facing the antenna section 42. When conductive coating is applied to the interior surface of the front outer cover 102, masking processing is performed on the region 300 so that conductive coating is not applied to the region 300. Thus, the region 300 is a region having an electrical resistivity high enough for wireless communication. Also, conductive coating is applied to a substantially entire region other than the region 300 on the interior surface of the front outer cover 102, and thus, the front outer cover 102 has an electromagnetic wave shielding function.

Threaded portions 301a and 301b which are provided at plural locations on the interior surface of the front outer cover 102 are attaching sections which are in intimate plane-contact with the top outer cover 101 when the front outer cover 102 is fastened and secured to the mirror box 53 together with the top outer cover 101. Since conductive coating is applied to a plurality of threaded portions 301a and 301b, the threaded portions 301a and 301b are electrically connected to the top outer cover 101 molded with a conductive resin. The antenna section 42 of the wireless substrate 41 is arranged in a region sandwiched between the threaded portions 301a and 301b and a peripheral region at the top of the antenna section 42 is covered by the top outer cover 101. Thus, although the antenna section 42 is surrounded by an electrically-connected outer covering member, the region 300 of the front outer cover 102 facing the antenna section 42 is a region having a relatively high electrical resistivity. Also, the antenna section 42 is provided at a position close to the right end of the wireless substrate 41 so as to be arranged farther apart from a portion corresponding to the optical axis 1a of the eyepiece optical system. Thus, the antenna section 42 is positioned away from a detachable lens mount 60 (see FIG. 2) as far as possible in the height direction of the camera. Since the antenna section 42 of the wireless substrate 41 can be arranged away from the detachable lens mount 60 serving as a conductive member as far as possible, a radio wave upon transmission or reception is hardly affected by the detachable lens mount 60.

Also, a threaded portion 301c subjected to conductive coating is formed at a position close to the lower end of -the interior surface of the front outer cover 102 and is secured and electrically connected to the metal frame of the main body frame 70. Likewise, a portion at which the front outer cover 102 is electrically connected to other conductive members is provided at plural locations on both left and right sides of the camera body 100.

In the present embodiment, the exposed portion of a ground pattern formed on the wireless substrate 41 is the fastening part 46 for the substrate fixing member 44 and is arranged at a position facing the antenna section 42 with the optical axis 1a of the eyepiece optical system therebetween. Specifically, the ground section of the wireless substrate 41 is connected to the substrate fixing member 44 at a position facing the antenna section 42 with the optical axis 1a therebetween. Also, the ground pattern of the wireless substrate 41 is connected to the metal frame of the main body frame 70, which is the frame of the camera body 100, via the pentaprism fixing member 57, the pentaprism holding member 58, and the mirror box 53. Thus, the ground pattern of the wireless substrate 41 can be surely connected to the electrical ground section of the camera body 100 in a state where a conductive member is spaced apart from the periphery of the antenna section 42 of the wireless substrate 41.

Also, a plurality of rack parts 58a provided on the pentaprism holding member 58 supports the member by being brought into abutment with the bottom end surface 44c of the substrate fixing member 44. The non-conductive resilient member 62 is bonded and secured between the wireless substrate 41 and the second reflection surface 51b of the pentaprism 51 in the vicinity of the antenna section 42 of the wireless substrate 41. With this arrangement, the wireless substrate 41 can be arranged substantially in parallel with the second reflection surface 51b of the pentaprism 51 in a state where a conductive member is spaced apart from the periphery of the antenna section 42. Thus, the wireless substrate 41 can be arranged in a space surrounded by the pentaprism 51, the mirror box 53, and the front outer cover 102. Consequently, the wireless substrate 41 can be arranged in the interior of the camera body 100 without increasing the size of the camera body 100.

Furthermore, in the present embodiment, the front outer cover 102 for covering the antenna section 42 of the wireless substrate 41 is molded with a non-conductive resin material and conductive coating or a vapor-deposited film is applied to the front outer cover 102 on the inner surface side of the imaging apparatus in order to obtain an electromagnetic shielding effect and an electrostatic noise reducing effect. In this manner, the entire camera body 100 is covered by a conductor, resulting in obtaining a high electromagnetic shielding effect. Thus, stray emission is prevented, and thus, the entire camera body 100 is less susceptible to an exogenous noise. It should be noted that a conductive coating film or a vapor-deposited film is not applied to the region 300 (see FIG. 6) facing the antenna section 42 of the wireless substrate 41 within the interior surface of the front outer cover 102. Thus, a radio wave to be emitted from or received by the antenna section 42 upon wireless communication is not shielded and is not interfered.

According to the first embodiment, a wireless communication unit can be arranged in an imaging apparatus that incorporates a flash unit such as a strobe or the like without increasing the size of the imaging apparatus in the height direction so as to ensure stable wireless communication state.

In the present embodiment, the wireless substrate 41 constituting the wireless communication unit and the substrate fixing member 44 for fixing the wireless substrate 41 are arranged between the pentaprism 51 and the outer covering member. The ground section of the wireless substrate 41 is connected to the substrate fixing member 44 at a position facing the antenna section 42 with the optical axis 1a of the eyepiece optical system therebetween. Then, the substrate fixing member 44 is attached to the fixing member of the pentaprism 51 so as to be electrically connected to the ground section (metal frame) of the camera body 100. Thus, a wireless communication unit can be arranged in an imaging apparatus that incorporates a flash unit such as a strobe or the like without increasing the size of the imaging apparatus in the height direction so as to ensure stable wireless communication state.

Second Embodiment

Next, a description will be given of a second embodiment of the present invention. In the second embodiment, a description will be given of a configuration in which the wireless substrate 41 is attached to the front outer cover 102. Components corresponding to or similar to those in the configuration of the camera body 100 according to the first embodiment are designated by the same reference numerals, and therefore, its explanation will be omitted. Hereinafter, the second embodiment will be described mainly on a difference between the first embodiment and the second embodiment.

Figure 7A:
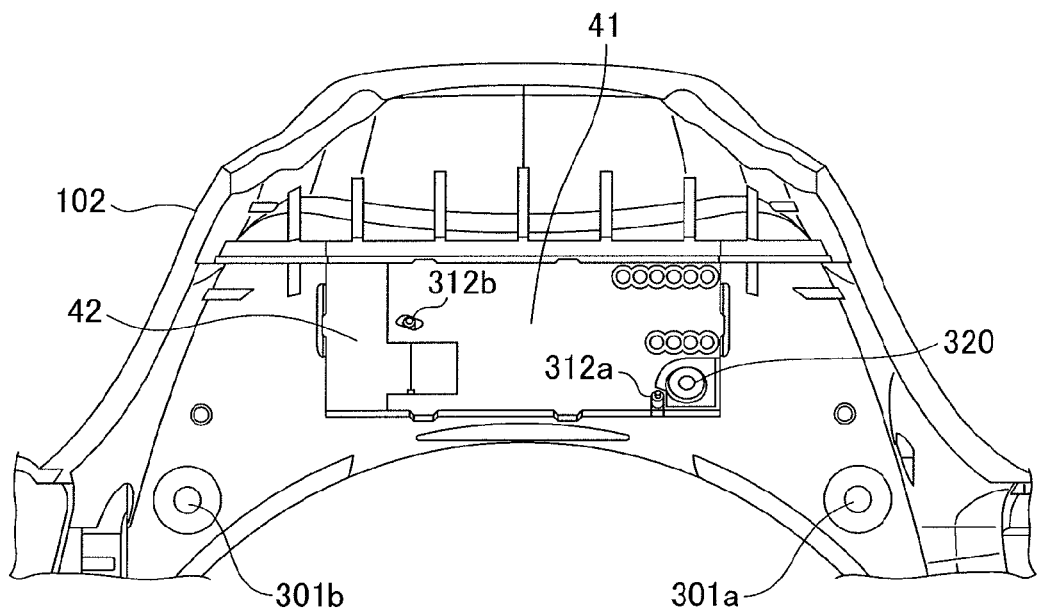
FIG. 7A is a view illustrating a front outer cover and a wireless substrate in order to explain a second embodiment of the present invention.
Figure 7B:
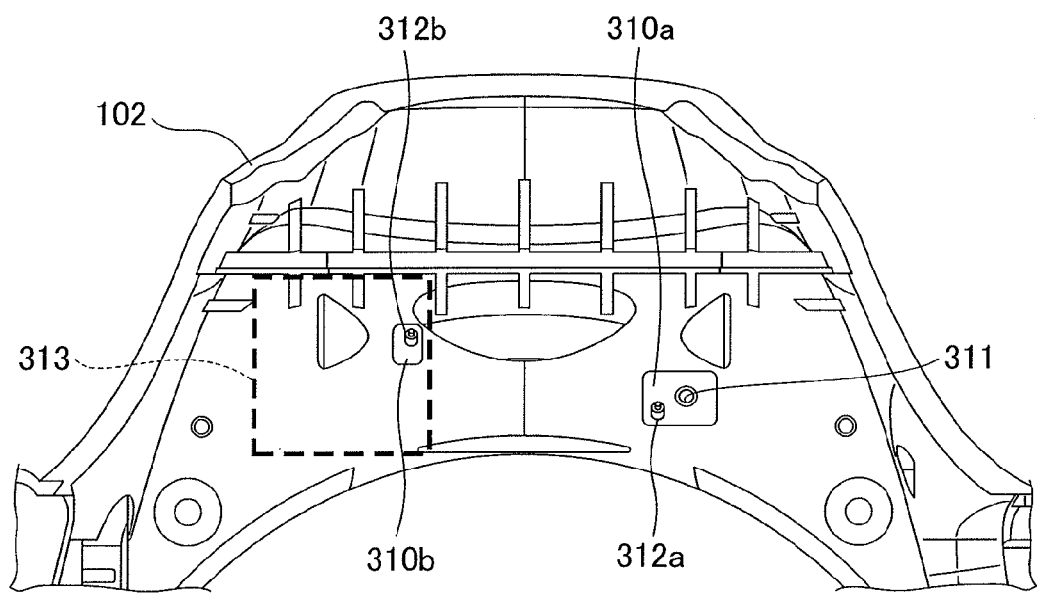
FIG. 7B is a view illustrating a front outer cover and a wireless substrate with the wireless substrate removed therefrom in order to explain the second embodiment of the present invention.

FIG. 7A is a view illustrating a state where the wireless substrate 41 is attached to the front outer cover 102 as viewed from the inside of the camera. FIG. 7B is a view illustrating a state where the wireless substrate 41 is removed from the front outer cover 102. In FIGS. 7A and 7B, only the peripheral portion of a portion in which the wireless substrate 41 is attached to the front outer cover 102 is shown in an enlarged state.

As shown in FIG. 7A, the wireless substrate 41 is fastened and secured by a screw 320. On the wireless substrate 41, the exposed portion 46 of a ground pattern is provided on the periphery of the fixing part by the screw 320 on the front outer cover 102 side. When the wireless substrate 41 is secured by the screw 320, the wireless substrate 41 is also electrically connected to conductive coating applied to the front outer cover 102. Conductive coating is formed on the interior surface of the front outer cover 102 as shown in FIG. 7B. The conductive coating may be conductive coating, coating by ion plating, or other conductive coating. In the present embodiment, a description will be given by taking an example of conductive coating.

A region 313 indicated in the dotted line frame shown in FIG. 7B is a region facing the antenna section 42 of the wireless substrate 41. Although conductive coating is applied to the interior surface of the front outer cover 102, masking processing is performed on the region 313 so that conductive coating is not applied to the region 313. With this arrangement, conductive coating is not applied to the region 313, and thus, the region 313 is a region having an electrical resistivity high enough for wireless communication. A screw seat 310a for securing the wireless substrate 41 with a screw fixing is provided on the front outer cover 102. Conductive coating is applied to a substantially entire region other than the region 313 on the interior surface of the front outer cover 102 including the screw seat 310a. Thus, the front outer cover 102 has an electromagnetic wave shielding function.

A screw seat 310a is provided with a first positioning portion 312a and a prepared hole 311 for the screw 320 in order to perform positioning of the wireless substrate 41. Also, a second positioning portion 312b is provided in a screw seat 310b. The screw seat 310b is arranged within the region 313 but the present invention is not limited thereto. The screw seat 310b and the second positioning portion 312b may also be arranged in a region other than the region 313. Conductive coating is not applied to the first positioning portion 312a and the second positioning portion 312b so as to provide a positioning function or conductive coating is applied to the first positioning portion 312a and the second positioning portion 312b to the extent not to interrupt the positioning function.

The front outer cover 102 is fixed by being brought into contact with the metal frame of the camera body 100 to thereby be electrically connected to the ground section of the imaging apparatus. Also, the top outer cover 101 which is molded with a conductive resin is fixed by being brought into contact with the rear outer cover 111 for electrical connection. The wireless substrate 41 is electrically connected to the ground section of the camera body 100 through the screw seat 310a. Only the region 313 including a region facing the antenna section 42 and the peripheral region thereof is a region having a relatively high electrical resistivity as compared with other regions. The wireless substrate 41 is connected with a camera substrate (not shown) using a known technique with use of flexible wiring, a coaxial thin line, or the like to thereby perform control of the wireless substrate 41.

In the second embodiment, the entire camera body 100 is covered by the outer covering member formed of a conductive resin and the outer covering member of which the interior surface is subject to conductive coating. Hence, the substantially entire region of the camera body 100 is covered by a conductor, resulting in obtaining a high electromagnetic shielding effect. Thus, the camera body 100 does not radiate undesired noises so that the camera body 100 is less susceptible to an exogenous noise. Also, conductive coating is not applied to the region 313 which covers the periphery of the antenna section 42 of the wireless substrate 41 on the interior surface of the front outer cover 102. A region having a sufficiently high electrical resistivity for the transmission of a radio wave is ensured so that communication with external equipment can be established by using the wireless substrate 41 that is built in the imaging apparatus. Furthermore, conductive coating is applied to the screw seat 310a which is provided on the front outer cover 102 and is used for securing the wireless substrate 41 and the ground section of the wireless substrate 41 is electrically connected to the ground section of the camera body 100, resulting in obtaining stable transmission/reception of an electromagnetic wave upon wireless communication.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-188015 filed on Aug. 28, 2012 and Japanese Patent Application No.2012-188016 filed on Aug. 28, 2012, which are hereby incorporated by reference herein in their entirety.

What is claimed is:

1. An imaging apparatus that incorporates a wireless communication unit for performing wireless communication, the imaging apparatus comprising:
   an optical member that guides light incident on the imaging apparatus to an eyepiece optical system; and
   an outer covering member that covers the optical member,
   wherein the optical member has a reflection surface that reflects incident light toward the eyepiece optical system,
   wherein the wireless communication unit is arranged in a space formed between the reflection surface and the outer covering member, and
   wherein an electrical resistivity of a region facing the antenna section of the wireless communication unit in the outer covering member is set relatively higher than the periphery of the region.

2. The imaging apparatus according to claim 1,
wherein the wireless communication unit is arranged in a space formed between the reflection surface and the outer covering member.

3. The imaging apparatus according to claim 2, wherein the outer covering member comprises a first outer covering member and a second outer covering member that are separated in the periphery of the reflection surface formed on the optical member,
wherein the wireless communication unit is arranged in a space formed between the second outer covering member and the reflection surface of the optical member,
wherein the second outer covering member is formed of a resin material having higher electrical resistivity than the first outer covering member, and
wherein the inner surface side of the imaging apparatus is treated so as to exhibit low electrical resistivity.

4. The imaging apparatus according to claim 2, wherein the outer covering member is a member formed of a non-conductive resin material,
wherein the outer covering member comprises a first outer covering member and a second outer covering member that are separated in the periphery of the reflection surface formed on the optical member,
wherein the wireless communication unit is arranged in a space formed between the second outer covering member and the reflection surface of the optical member, and
wherein the surfaces of both the first outer covering member and the second outer covering member on the inner surface side of the imaging apparatus are treated so as to exhibit low electrical resistivity.

5. The imaging apparatus according to claim 3, wherein, on the inner surface of the second outer covering member, conductive coating is not formed on a region facing the antenna section of the wireless communication unit but is formed in a range excluding the region.

6. The imaging apparatus according to claim 3, wherein the antenna section of the wireless communication unit is positioned between a plurality of attaching sections for fixing the first outer covering member and the second outer covering member.

7. The imaging apparatus according to claim 3, wherein the wireless communication unit is attached to the second outer covering member.

* * * * *